July 20, 1948.                W. PETERS                2,445,633
                            CABLE CONNECTOR
                          Filed July 23, 1945
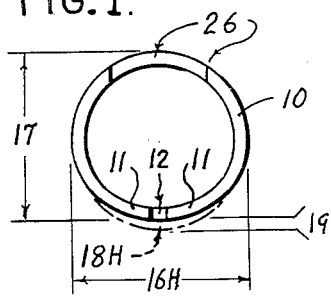
FIG. 1.
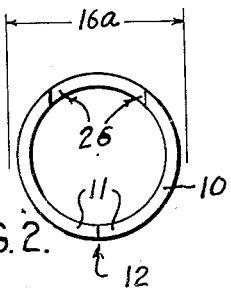
FIG. 2.
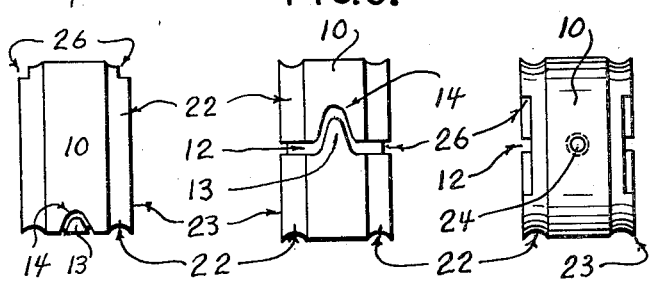
FIG. 3.
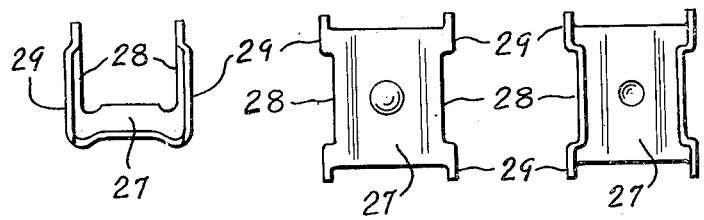
FIG. 4.
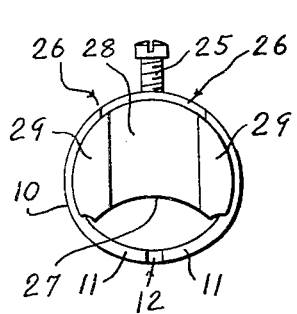
FIG. 5.
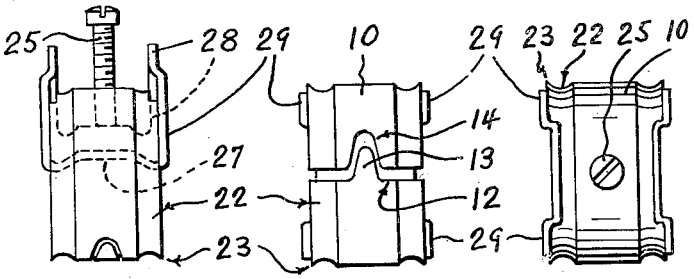
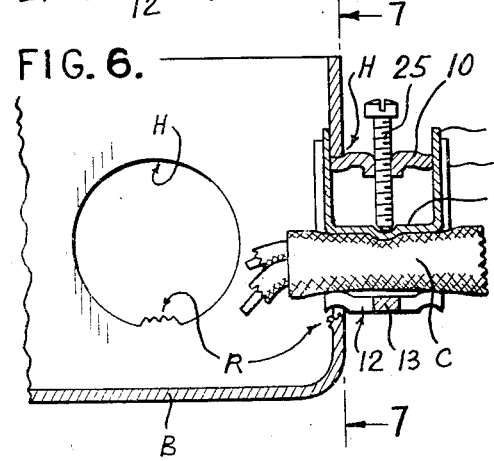
FIG. 6.
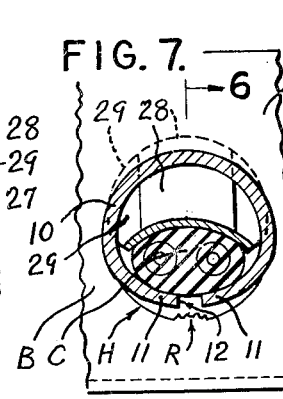
FIG. 7.   FIG. 8.
INVENTOR.
WALTER PETERS
BY James C. Ledbetter
ATTORNEY.

Patented July 20, 1948

2,445,633

UNITED STATES PATENT OFFICE 2,445,633

CABLE CONNECTOR

Walter Peters, Linden, N. J., assignor to The Thomas & Betts Co., Elizabeth, N. J., a corporation of New Jersey Application July 23, 1945, Serial No. 606,587

4 Claims. (Cl. 285—6.5)

This invention relates to a new and useful cable connector for securing a conductor cable in an electrical box constituting a part of the installation in a wiring race-way system.

More particularly, the invention relates to a cable connector for use with non-metallic sheathed electrical cable (or what is sometimes referred to as unarmored cable), and the connector possesses new features facilitating its installation in the knock-out openings of electrical boxes.

A purpose of the invention is to produce a new cable connector having a structural form and mode of operation distinguished in respect to the prior art (as represented, for example, by Church United States Patent 1,644,308, issued October 4, 1927), and which retains the simplicity of the Church construction but overcomes the installation problems and inconveniences sometimes encountered in the field when employing connectors of that well known form in wiring installations. The old cable connector referred to has supplied for a long period a popular demand in building and house wiring jobs, especially where non-metallic sheathed or unarmored cable C, as shown in the Church patent, is employed.

However, it is sometimes said to be difficult to insert the connector sleeve or body 5 of the Church patent in the standard knock-out opening or hole H through which the cable C passes into the electrical box B due, among other causes, to the necessary close fit of the round body 5 with the box hole in order to insure permanent retention of the installed connector in the box. In fact, the old type connector sometimes must be struck with a hammer to force it into the box hole.

Likewise, the round body 5 of the Church connector may not readily snap or slip into the hole H of the electrical box B due to burrs or irregular and ragged portions sometimes remaining on the edge of the box hole after knocking the usual closure plug (called the knock-out plug) therefrom preliminary to inserting the cable connector into said box; and it is this prevailing condition and lack of hole edge smoothness which interposes difficulty, and indeed probably the greatest problem encountered, in producing a close-fit cable connector of the type in question which is readily insertable into the knock-out opening of a box.

And in addition to the foregoing problems, the adapter or cable-clamping saddle 14 of the Church patent may at times lack operatively guided sliding retention within the sleeve body 5, thus causing misoperation or even becoming loosened or displaced from the body which may lead to inconvenience to the wiring mechanic when he has to readjust the clamping saddle in the body.

The foregoing are considered the more important problems which that well known type of cable connector presents, and which are sought to be overcome by the present invention without sacrificing the advantages of the old connector, to which brief reference is made above. And in finally attaining the present solution of the problems, one of the major factors involved is to retain the structure of the Church connector when reforming it to make for simplicity and convenience in its installation.

Accordingly, an important purpose of the present invention, if indeed not the most important one, is to produce a cable connector possessing the necessary close fit with a box hole which can be more readily and conveniently inserted therein by a wiring mechanic, without having to force or hammer the connector into place, particularly where the edge of the box hole may be uneven, irregular, or have burrs left thereon (after the knock-out plug is struck from the box) which ordinarily interfere with inserting a close-fit connector in the knock-out hole, but which is now overcome with the new type of close-fit connector herein described.

The foregoing important purpose of the invention is attained by producing a rolled-up longitudinally split ring body having a major diameter thereof made on the same diameter as the box hole for establishing a close fit therewith, and also made with a segmental portion having a smaller diameter or dimension which is somewhat less than the major diameter, thus rolling-up or forming this newly shaped connector body from two centers, hence out-of-round, and thus providing a body which (when compressed by hand to install it in a box hole) momentarily becomes round by reduction of its over-all size to the minor dimension or diameter; and since the latter diameter is somewhat less than that of the box hole H, it follows that this new cable connector very easily slips into place and then expands to normal out-of-round shape and box-hole size for latching therein with a tight and close fit.

Another purpose is to provide a cable connector having a new structural form of cable-clamping saddle which positively is movably retained in operating relation with the connector body without likelihood of becoming displaced from its normal operating position.

This description and the accompanying drawings explain the invention and suggest further purposes thereof, present it in a manner preferred at this time, demonstrate the features thereof in order to disclose the scope and principles of the invention, thus suggesting further examples thereof which may develop out of the teachings herein or occur to others who may avail themselves of the benefits of the invention, and also aid in understanding the problems sought to be solved.

Figs. 1 and 2 are to be considered together in connection with explaining the dual diameter features of the cable connector. Both are end views of the body part alone and include a diagrammatic showing (by the use of comparison pointer lines) of the two different sizes of which the connector is capable of assuming.

Fig. 1 shows the out-of-round connector body at its normal size—before and after inserting it in a box hole.

Fig. 2 shows the connector body momentarily compressed by which it substantially, throughout is rolled-up circular form, uniformly takes on a smaller diameter at the moment a wiring mechanic presses it by hand to insert it in the box hole.

Fig. 3 is a group of views showing the dual-diameter ring body (reading from the left) in side, bottom and top elevations.

Fig. 4 is also a group of views showing a new form of cable clamping saddle—side, bottom and top elevations—which is operatively carried by the out-of-round connector body in a new manner as distinguished from the prior art heretofore mentioned.

Fig. 5 shows elevational views of the assembled cable connector comprising its three parts, namely, a ring body, a cable-clamping saddle, and an operating screw. Noting from left to right, there is shown the end, side, bottom and top views of the complete connector.

Fig. 6 shows a section on the line 6—6 of Fig. 7, the new cable connector in question being mounted in a knock-out box hole and gripping a cable therein, the ragged burred edge being shown at the left in elevation where the knock-out plug has been removed, and at the right in section where the connector is shown installed with a cable. And Fig. 7 shows a sectional view made on the line 7—7. These two views, when read in connection with Figs. 1 and 2, demonstrate the dual-diameter cable connector in relation to a standard type of electrical box having round knock-out holes.

Fig. 8 is a fragmentary, outside, elevational view of a conventional electrical box long in use and shows only that portion thereof which relates to the knock-out opening. The knock-out plug is shown in place in this view, whereas Fig. 6 shows that the plug has been knocked from both box openings shown.

Referring further to the drawing, and in order to more fully understand the new close-fit connector herein and its mode of operation, notice is first taken of a standard or conventional electrical box B (Figs. 6, 7 and 8). Incidentally, in the manufacture thereof, a knock-out plug P (Fig. 8) usually is punch-depressed or defined in circular form by a machine punch which does not strike through the box wall. This leaves a partial punch cut, in the form of a hole circle HC, defined inwardly of the wall, with the plug P left hanging or remaining in place, to present a solid box wall, due to the partial cut HC which retains a hold on the plug P and maintains it in place.

However, the machine punch (as known in the art) has a recessed non-cutting segment of a few degrees which, when it strikes the box wall B to pre-form the box hole circle HC, leaves an uncut segmental area or ear E which remains integral with the knock-out plug P and box wall B. This operation weakens the ear E due to the forming pressure of the punch which depresses this area of metal. Thus, the plug P retains a substantial hold in the box wall pre-formed circle HC by reason of not being punched fully through, plus the grip of the weakened ear E remaining in part integral with the plug.

As well known, the plug P readily responds to the tap of a hammer and immediately frees itself from the box hole circle HC (Fig. 8) to provide a hole H (Figs. 6 and 7) when the mechanic is ready to make one or more of these knock-out openings available for the reception of one or more electrical cables C (Figs. 6 and 7). The several other knock-out plugs P (not shown) in the box, which may not be required in the wiring installation, remain intact to form a solid box wall enclosure.

In knocking the plug P from the box B, the previously weakened ear E usually forms a jagged, burred and roughened edge R (Figs. 6 and 7) which more particularly spoils an otherwise smooth and clean box hole H. Thus the true circle of the box hole is frequently interrupted by the inwardly projecting ragged burr R formed by bending and rupturing the ear E when forcing the ear to let go by hammering on the plug P to knock it out. It is the lack of smoothness around the edge of the box hole H (more pronounced at R) which causes inconvenience when installing the old type of close-fit cable connectors of the prior art.

Having in mind the foregoing conditions encountered with electrical boxes in general, when installing the electrical cable C therein with this type of close-fit connector, it is thought that the ensuing description of the cable connector, and its combination with a box, will be more readily appreciated, especially in the new connector herein which not only is the same size as the box hole H but also is smaller than the box hole (at the moment of entry) and characteristically bridges over the rough edge R without interference from the latter.

The body of the new connector is shown at 10, in the form of a ring or ring-like body, which may be made from a sheet metal strip wrapped or rolled up to non-circular form in order to produce a connector body having its greater segmental portion formed on one diameter and a smaller segmental portion defined by another diameter. Ends 11 of the body strip come together in spaced relation to provide a longitudinal slit at 12 to render the body 10 resilient in order that it may contract and expand.

One end 11 of the ring body 10 includes a tongue 13 which laps across the slit 12 and extends into a cut-out 14 of the other end 11 of the wrapped-up body. Clearance exists between the tongue 13 and cut-out 14 in order that no friction or rubbing may occur between the tongue and cut-out, thus making for freedom during the contracting and expanding motion of the ring body 10. The tongue 13 and cut-out 14 are symmetrical, and together they impart a serpentine configuration of convoluted form to the longitudinal slit 12.

The two free ends 11 of the circular body 10 comprise segmental portions (shown herein as being about one-quarter of the circle) which are trained or depressed inwardly toward the center of the body and may be on a radius slightly less than the radius of the remaining three-quarter circular portion of said body. These two segmental free end portions 11 and 11 are formed, as for example, on what may be said to be the bottom side of the body 10. In this way, the segmental ring end portions 11, which are curved inwardly, form a shorter or minor dimension across the body (for one-quarter of the circle) than the actual diameter of the remaining (three-quarter) circular portion thereof.

Noting Fig. 1, it will be seen that an arrow 16H measures (between two parallel pointer lines tangent to the body 10 at its diametrically opposite sides) the outside major diameter on which the greater segmental portion of the body is formed; and this dimension 16H is the same diameter as the box hole H. On the other hand, an arrow 17 (between its pointer lines) measures the minor dimension or lesser diameter of the body 10 due to the formation of the ends 11 being bent inwardly to the slight degree shown. It is the outside major diameter 16H, for three-quarters of the body circle 10, which makes a tight fit in the box hole H; while it is the minor outside diameter 17, providing eccentricity of the body ends 11, which provides for simple and easy insertion of the body into said box hole.

Thus the major diameter 16H of the connector body 10 is greater than the minor dimension 17, the difference between the two being equal to the amount at which the eccentrically disposed end segments 11, forming the slit 12, are curved inwardly out of a true circle (indicated by dot-dash arc 18H) to which otherwise the body 10 would conform, as in the prior art represented by the Church patent. Such difference between said two diameters 16H and 17 is shown (Fig. 1) by the two parallel pointer lines 19, where the lower line 19 is tangent to the major diameter (dot-dash arc 18H), while the upper line 19 is tangent to the minor diameter 17 established by the inwardly curved free end segments 11. The dot-dash arc 18H is a continuation of the major diameter 16H of the connector body 10 and is the same diameter as a standard size box hole (as at H in Figs. 6 and 7, at HC in Fig. 8, and 18H in Fig. 1).

Incidentally, the related reference characters HC, H, 16H and 18H all show the diameter of the box hole and also the outside major diameter (three-quarter portion) of the body 10 in connection with explaining the dual-size feature of this new cable connector. It will also be noted that the inwardly curved segmental body portions 11 (which are eccentric to the body circle 10) are equally and symmetrically formed and disposed at each side of the longitudinal serpentine slit 12 of the body 10, the slit 12 being interrupted or bridged across by the lap of the interfitting tongue and cut-out means 13, 14.

According to the foregoing, a wiring mechanic may easily depress the ring body 10 by pinching it between his fingers in the direction indicated by the major diameter arrow 16H causing said major diameter to decrease and approach toward or attain a dimension equal or approximately so to the minor or shorter dimension 17. In that way, the general overall diameter of the ring body 10 is substantially reduced (see Fig. 2). It is this latter feature which makes it very simple and easy to insert the connector body 10 in the standard box knock-out hole H in accordance with this invention, despite any unevenness or irregularity left in the box hole H, whether caused by a poor and inadequately clean breakaway of the knock-out plug P from the hole circle HC, or whether caused by an abnormal inwardly projecting ragged ear edge E, or by both such conditions.

Coming now to Fig. 2, it is presented as a companion view to Fig. 1 and demonstrates (a) the reduction in size of the connector body 10 heretofore explained, and (b) how it takes on a round formation in doing so. The major diameter pointer lines 16H (Fig. 1) are shown extended to embrace the pinched or reduced body 10 diagrammed in Fig. 2, and are there shown at 16a. It will be seen that the major diameter indicating lines 16H and 16a are no longer tangent to the reduced circle of the connector body 10 in Fig. 2. This is due to the fact that the out-of-round body 10 of normal box-hole size 18H in Fig. 1 now has been compressed and has attained a circular or round formation in Fig. 2.

Accordingly, the wiring mechanic has compressed or pinched the connector body 10 (at Fig. 2) and closed the slit at 12 by bringing the ends 11 together. This general reduction in diameter occurs fairly uniformly in the major diameter body portion, not in the off-circle ends 11, in consequence of which said major diameter three-quarter portion reduces to a radius comparable to the slightly shorter radius of the segmental one-quarter end portions 11. The result is that the entire body 10, 11 assumes a new radius, more nearly the shorter radius of the end portions 11, by symmetrically reforming itself to a more or less true circle, as in Fig. 2.

It follows therefore that the connector body 10, when compressed from Fig. 1 to Fig. 2 form, becomes circular—and significantly it then is less than the diameter 18H (also 16H) of the box hole H. For this reason, the close-fitting body 10, although the same size as the box hole H (and therefore ordinarily difficult to insert), is nevertheless now easily and readily fitted into the box hole. It is then released from between the mechanic's fingers and instantly expands, due to its resilience, into place in and against the box hole edge H. This will be more readily understood from the description to follow of the latching grooves in the body 10 and other features to complete the connector.

Having diagrammed (Figs. 1 and 2) certain of the principles involved, reference is now made to other views in the drawings. A latching groove 22 is formed annularly in each end of the connector body 10 to engage the box hole edge H. Since the bottom of the annular groove 22 is the same diameter as the box hole H, it follows that the outer tip edge or rim 23 of the groove is the same diameter as the central portion of the body and actually of greater diameter than the box hole. Consequently, the reduction in size, from Fig. 1 to Fig. 2 is for the purpose of decreasing the size of the body groove rim 23 to enable it to pass through the box hole H in order that the smaller groove 22 may expand and latch into the box hole (see Fig. 6).

Next, the body 10 is provided with a threaded screw hole 24 centrally thereof and opposite the longitudinal slit 12; and an operating screw 25 (Figs. 4 and 6) it mounted in this hole. The screw length is sufficient to place its inner end somewhat beyond the axis or center of the connector in the event the screw is run inwardly to its limit, although when installed (Figs. 6 and 7) this limit is not reached due to the presence of the cable C.

Finally, the connector body 10 has a guide slot 26 formed in each end thereof and in opposite relation to the slit 12. The depth of this guide slot is about equal to the thickness of the sheet metal or material of a cable-clamping saddle hereinafter explained, and also the reach or segmental length of the slot 26 conforms to a counter-portion of the saddle which rides in said slot, as will be explained. There is one particular point involved, and that is to the effect that the reach or segmental length of this saddle guideway slot 26, for the best mode of operation, preferably is at least equal to or greater than the radius of the box hole H. In other words, the arcuate or segmental length, as measured laterally between the two spaced shoulder notches 26 defining said guideway, is shown to be somewhat greater than the radius of the connector body 10. The reason for this substantial or maximum width of the guide slot 26 is better explained in connection with the cable-clamping means or saddle, as next assembled with the connector body 10.

According to the foregoing, a one-piece cable-clamping saddle (of general U-shape form when viewed in side elevation) has a pressure seat 27. This seat is formed and carried integrally between the lower edges of spaced parallel shutter-like end plates, each of which is depressed to provide a web in the form of a rib 28, and including a flange 29 at each side of each rib. The rib 28 is depressed centrally between the two side flanges 29 and together constitute the end plate. Thus it is seen that an end plate 28, 29 is provided at each extremity of the saddle pressure seat 27. This pressure seat is arched to clamp against the oval or rounding surface of the cable C (Figs. 6 and 7).

The two shutter end plates 28, 29 form a sector greater than 180 degrees and act to close that portion of the connector body 10 not occupied by the cable C. The sectoral form of the end plates is generated from a radius which locates the perimetric edge of the shutter-like end plate about half way the thickness of the metal forming the three-quarter major diameter body portion 10, as observed at the left-hand view of Fig. 5 showing the end of the assembled connector. There, it is seen that the shutter 28 is in its down position, concentric with the body 10, and that the sectoral edge of the shutter is located midway of the thickness of the body when it is expanded to normal size. Thus the radius of the sectoral shutter-end plates 28 is purposely smaller than the radius of the box hole H in order that they may readily pass through, as shown in Figs. 6 and 7.

The clamping saddle pressure seat 27 is operatively mounted within the connector body 10, parallel to the axis thereof, and this position places the two end plates 28, 29 at each extremity of the body and at right angles to its axis. The two end-plate ribs 28 are formed in width for a close sliding fit with the guideway 26 at each end of the connector body. Thus the clamping saddle 27 is slidably carried in and on the body 10 and is adapted to be operated under the pressure of the screw 25.

The guideways 26 are die-cut to an exact and accurately predetermined size and spacing in order to attain a constantly uniform dimension between said two guideways, one in each end of the connector body 10. Such method of die forming the bodies, with die-cut guideways 26, affords a uniform fit of the clamping saddles therein for mass machine production of the connectors. Thus the variation of a few thousandths of an inch, which exists in the commercial width of the stock strip metal from which the bodies 10 are made and which causes the overall length of the bodies to vary in the mass production thereof, does not mitigate against the uniformity of fit between the bodies and clamping saddles in the course of manufacturing in quantity.

In other words, the die-formed clamping saddles themselves are exact and uniform in their dimensions, as between the spaced rib end plates 28, but the stock strip metal for producing the bodies 10 is not of uniform width. The latter difficulty is overcome by die-cutting the two spaced guideway slots 26 to exact dimension (irrespective of the variation in width of the body stock strip), to receive and establish an operating fit with the ribs 28 of the saddles. Consequently the side flanges 29 are not depended upon for an operating or sliding fit with the bodies which vary in length, and this is an important manufacturing advantage.

Next to be understood is that by providing a wide slot forming the guideway 26, it follows that the shoulders 26 defining the guideway are located substantially down on each side of the body 10 and away from a medial center line passing through the guideway. This means that the slidable ribs 28 constitute the greater area of the shutter-end plates. The wide slot 26 and its correspondingly wide rib 28 slidable therein are both designed and constructed for the purpose of maintaining the clamping saddle 27 in operative and sliding engagement for all its positions within the connector body 10. It is found that this feature of maximum width minimizes the likelihood of the slidable cable-clamping saddle from dropping out of place when it is down to the limit as shown in the left-hand view of Fig. 5.

Accordingly, the wider or longer the arcuate reach of the slot 26, and the wider the cooperating rib 28, the greater is the guided retention thus provided for the clamping saddle 27 in and upon the connector body 10. One relationship found to be efficient in this connection is to make the arcuate reach of the slot 26, that is, the distance between the slot shoulders 26, and hence the width of the rib 28, a little greater than (or comparable to) the radius of the connector body 10 at its full normal size. This relationship is shown in the drawings in connection with demonstrating the principle involved and the commercial form of manufacture.

The foregoing maximum width of the shutter rib 28 and the widely spaced guideway shoulders 26 prevents the shutter rib from coming out of place from the body 10 when handling the connector preliminary to inserting it in the electrical box B. Furthermore, it is found that this maximum width guiding feature renders possible a minimum size for the shutter ends, and makes practical the manufacture thereof in size, relatively to the body 10, as shown in the left-hand view of Fig. 5.

Coming next to the use of the cable connector, its installation in an electrical box B is shown in Figs. 6 and 7. Either grooved end 22 of the connector is inserted in the box hole H (the simplicity of which was previously explained), the clamping saddle 27 then lifted upwardly, and the cable C inserted under the saddle. The screw 25 then is tightened down to grip the cable C between the saddle and the bottom inside of the connector body. The pressure of the screw 25 causes the body 10 to expand (note the spread of the slit 12 in Fig. 7) to the limit of the box hole H and permanently locks it within the box. This is accomplished by virtue of the expanded pressure engagement of the three-quarter major diameter portion of the body 10 against the box hole edge. Incidentally, the sectoral shape of the end shutters 28 maintains closed the open ends of the body 10 for all sizes of cable which the connector is adapted to receive.

In addition to the foregoing, one of the more important features of the connector, and its new mode of use with the conventional box, will now be explained. When the connector is to be inserted, the mechanic having momentarily compressed it (Fig. 2) to the round form smaller than the box hole H, he then simply lines up or matches the bottom slit 12 with the burred edge R of the box hole and inserts the connector. This selected position of the connector in the box is shown in Figs. 6 and 7, where the eccentric segmental ends 11 of the body are shown spaced above, that is, in alignment with, and in clearance relation to, the ragged or burred edge R of the box hole. Consequently the eccentricity of the connector portion 11 prevents it from impinging the ragged edge R and causes it to bridge over and easily slip into the box hole H.

Now will be seen a further advantage of devising the eccentric body ends 11 in combination with the serpentine slit 12, 13, 14. This arrangement supports the cable C well above the burred edge R (Figs. 6 and 7) of the box knock-out opening H and provides such adequate clearance between the cable and box hole as to insure against contact of the cable with the box hole edge in the event the cable should squeeze down into the slit 12.

According to all the foregoing, it will be seen (a) that momentarily compressing the connector reduces its size (Fig. 2) to a diameter less than that of the box hole H and therefore any lack of a clean break-away of the knock-out plug P from its hole circle HC does not interfere with inserting the connector; also (b) it will be appreciated that the eccentricity at 11 of the body 10 provides for easy slip-in of the connector despite the presence of burrs R left by the plug P when broken away from its retaining ear E; and (c) that this new cable connector possesses a tight fit and close relationship with the box hole.

The disclosure herein explains the principle of the invention and presents the best mode contemplated in applying such principle, so as to distinguish the invention from others; and there is particularly pointed out and claimed, the part, improvement or combination, which constitutes the invention or discovery, as understood by a comparison thereof with the prior art.

This invention is presented to fill the need for a useful cable connector. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:

1. A cable connector comprising a ring-like body having an annular groove and a longitudinal slit, and having the major portion of its ring-like body formed on a diameter adapted to be received into the knock-out hole of a box, the end portions of the body adjacent the longitudinal slit being depressed inwardly of said diameter, thereby adapting said end portions to have clearance relation with a ragged and uneven edge portion of the box hole, and an operating screw mounted in the body for clamping a cable inserted therein and expanding the annular groove into anchored engagement with the edge of the box hole.

2. A cable connector comprising a ring-like body having an annular groove and a longitudinal slit, and being formed out-of-round by rolling-up a portion thereof on a major diameter and the remaining portion on a minor diameter, thus forming a body capable of being contracted by inward pressure to a size substantially equal to a ring having said minor diameter, and operating means carried by the ring-like body for clamping a cable inserted therein and expanding the annular groove into anchored engagement with the edge of a box hole.

3. A cable connector comprising a ring body with end grooves and a longitudinal slit, and being formed out-of-round by rolling-up more than 180 degrees of the body on a major radius and less than 180 degrees of the body on a minor radius, thus forming a dual-diameter body, whereby the connector may be compressed to reduce its size to approximately its minor radius, and operating means carried by the body to expand and lock it in an electrical box hole into which the cable connector is adapted to be mounted.

4. A cable connector comprising a rolled-up body having a longitudinal slit adapting said body to contract and expand, a guideway slot provided at each end of the body opposite the slit, the guideway slots being formed by spaced shoulders die-cut into the body ends, said shoulders being spaced apart a distance at least as great as the radius of the body thus providing a substantially wide guideway; a clamping saddle having a pressure seat disposed within the body, and having a shutter-end plate of sectoral form carried at each end of the pressure seat, with a rib depressed inwardly of each shutter-end plate and of a width also at least as great as the radius of the body, said ribs being slidably mounted within the wide guideways of the body; and an operating screw mounted in the body opposite the slit and effective against the clamping saddle to force the pressure seat toward the slit.

WALTER PETERS.

REFERENCES CITED

The following references are of record in the file of this patent:

UNITED STATES PATENTS

| Number | Name | Date |
|---|---|---|
| 1,644,296 | Thomas | Oct. 4, 1927 |
| 1,734,202 | Church | Nov. 5, 1929 |
| 1,787,668 | Church | Jan. 6, 1931 |
| 1,793,883 | Church | Feb. 24, 1931 |
| 1,816,667 | Church | July 28, 1931 |
| 1,816,668 | Church | July 28, 1931 |
| 1,833,988 | Church | Dec. 1, 1931 |
| 1,938,974 | Oldberg | Apr. 10, 1933 |